Aug. 13, 1963   R. G. SHALER ETAL   3,100,707
ADDITION OF DRY HECTORITE TO BEER
Filed March 21, 1961

INVENTORS
Richard G. Shaler
Richard G. Shaler, Jr
Raymond L. McAdam
BY
Townsend and Townsend
attorneys

United States Patent Office 3,100,707
Patented Aug. 13, 1963

3,100,707
ADDITION OF DRY HECTORITE TO BEER
Richard G. Shaler and Raymond L. McAdam, San Anselmo, and Richard G. Shaler, Jr., San Rafael, Calif., assignors to American Tansul Company, San Francisco, Calif., a corporation of California
Filed Mar. 21, 1961, Ser. No. 97,254
7 Claims. (Cl. 99—48)

This invention relates to an improvement in the process for treating beer or similar beverages such as wines and fruit juices whereby the beverages are improved in clarity, stability, and qualities or brilliance, sparkle, and taste. The invention relates to an improvement in the treatment of beer with a swelling gelling clay, preferably a montmorillonite clay such as hectorite.

Specifically, the invention relates to a new method of "chill-proofing" beer or other beverages by the use of a dry swelling gelling clay of the montmorillonite group and preferably hectorite. When heretofore the clay has been first placed in an aqueous suspension prior to introduction into the beer, the present invention contemplates direct addition of the clay to the beer in dry pulverant form. The results show a surprising increase in yield of beer and excellent product stability.

Reference is made to the accompanying drawing in which.

Figure 1:
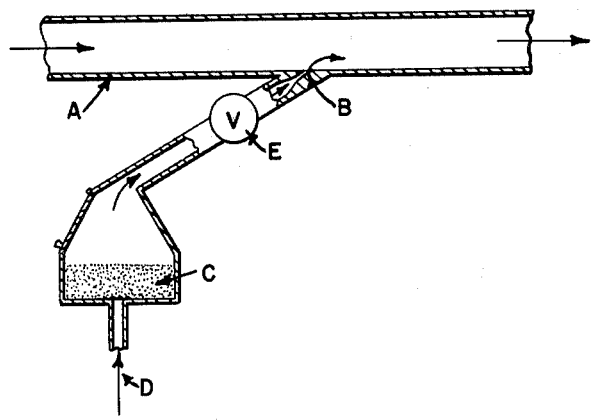
FIG. 1 shows schematically the introduction of an appropriate clay into beer in accordance with the preferred techniques of the present invention.

Beer production follows a generally accepted sequence of steps. First, aqueous extract from suitable grain must be fermented to produce the beer. After fermentation has been completed, the temperature is dropped to approximately 30° F. and the beer is transferred from the fermentation equipment into a storage vessel for a rest or aging period at about 30–32° F. The rest period may be as little as five days and in some cases as much as three months. Carbon dioxide may or may not be introduced into the beer during the rest period. The $CO_2$ is used to partially carbonate the beverage and to purge the liquid of entrapped air. After storage, the beer is put through a pre-clarification operation. This is usually accomplished by some mechanical means such as a centrifuge or a filter. The beer is then transferred into a finishing storage tank for another storage period of about one to five days, during which final carbonation is accomplished. Following the finishing period, the beer is polish filtered. The beer is then in a form as found in the final product when purchased by the consumer.

During the course of the processing subsequent to fermentation, several treatments have become standard which serve to stabilize and make the final product more desirable in many respects. The beer may be treated with a clay in accordance with the method described in United States Patent No. 2,416,007, dated February 18, 1947. That patent teaches the addition of an aqueous suspension of a magnesium silicate clay into the beer for removing foreign and partially soluble substances from beer such as undesirable proteins and proteinaceous complexes. The present invention is an improvement upon the broad concept of that method of treating beer after fermentation and comprises contacting the beer with a swelling gelling clay such as montmorillonite clay, preferably hectorite, in substantially dry form and then completing the usual process. The gist of the invention is in the addition of the clay in a substantially dry form as distinguished from the aqueous slurry previously thought to be necessary.

As in the prior procedure, the clay may be introduced at any point in processing after fermentation. Also, in accordance with prior techniques, additional treatments alluded to above for stabilizing and clarifying beer may be employed. These additional steps include the use of reducing agents such as potassium metabisulfite, or preferably $SO_2$ gas itself, in accordance with United States Patent No. 2,916,377 dated December 8, 1959. It is also common to employ a proteolytic enzyme such as bromelin and/or papain. The use of these other materials in the present improved process is unchanged from prior art techniques in any respect such as quantity employed or point in the brewing process where it is added. For example, when $SO_2$ gas is used, it may be introduced in the range of 5 to 30 parts per million and the enzyme dosage may be between 500–15,000 activity units per 100 barrels of beer processed, and they may be added at any point after fermentation, individually or simultaneously.

When the clay is added in substantially dry form in accordance with the process, numerous unexpected advantages are obtained. Perhaps the most significant phenomenon that has been observed is that the dry clay does not swell or hydrate in the beer as is true of the clay when used in an aqueous slurry.

Without intending to limit the invention with respect to any theory herein advanced, it is believed that the absence of swelling or hydration of the dry clay may be due to one or more of the following factors: the physical characteristics of the dry clay itself when added to beer are much different than when the clay is first hydrated and then introduced into the beer; the alcoholic content of the beer or the electrolyte content of the beer have a different effect on dry clay than on slurried clay.

The significance of the difference of the lack of swelling or hydration of the dry clay as opposed to the slurried clay is that in a wet addition of the clay, the fully hydrated clay flocks and precipitates, forming a sediment on the bottom of the treatment tank. When the dry clay is added, it remains in the beer in particle size and no flocculation as such occurs. In the case of dry addition of hectorite, adsorption of undesirable molecules is believed to take place upon a larger particle size than in the case where slurried clay is used.

The practical advantages which follow from the use of dry clay include the ease with which the beer may ultimately be filtered because of the simplicity of separating the non-flocculated clay after it has performed its function. Most important, the use of dry clay greatly reduces the volume of entrapped beer in the clay because of the non-flocculated high density characteristic of sludge formed with the clay. This means a higher yield of beer per unit of beer making ingredients employed which, of course, is economically desirable.

As noted above, the dry clay is added in approximately the same amount as the clay used in the previous slurry techniques. Preferably, the clay used is hectorite and is most suitably employed in a quantity of about 120–500 parts per million of beer. The addition is made at any convenient point in the processing after fermentation.

Any suitable method for adding the clay to the beer is within the scope of the present invention. It is contemplated that the dry clay may be added batch-wise to tanks of beer, for example, during the initial rest or ruh after fermentation.

A most suitable method of adding the dry clay, which is preferably added in a pulverant or powdered form, is by injecting a gas propelled stream of the powdered clay into the beer. This is suitably accomplished while the beer is being flowed through a transfer line as schematically illustrated in FIG. 1. With reference to FIG. 1, the beer being processed is flowed through transfer pipe A in the direction of the arrows. A nozzle B is inserted in atmospheric sealed relation to pipe A. Suitable substantially dry clay in powdered form is kept in a sealed storage compartment C. A source D of gas, propelled under pressure, is connected to clay storage compartment C. The gas supplied from source D is directed into the storage compartment C and causes a portion of the clay within C to be lifted and borne on a current of the gas stream and injected through nozzle B into the beer flowing in A. A valve means E opens and closes communication between pipe A and the clay and gas supplied from C and D.

While numerous inert gases such as nitrogen could be employed, it is preferred to use carbon dioxide as the gas propellant. This is because $CO_2$ is a native material to the beer itself. In addition, carbon dioxide is generally introduced at the time when the clay is introduced in order to purge air that might be entrapped and for partial carbonation of the beer.

It has been found that a gas pressure of about 40 pounds in excess of the beer line pressure is suitable for propelling the clay into the beer line without permitting clogging of the inlet port or nozzle B and for causing a uniform dispersion of the clay in the beer line. It will be obvious to those skilled in the art that this pressure is subject to considerable variation for accomplishing the desired purpose.

To further illustrate the details and advantages of the present improved process, the following examples are offered. It should be understood that they are given for illustrative purposes only and should not be construed as limiting the invention in any respect.

The Pulfrich unit referred to in the examples is defined as a term of relative turbidity as measured by a Zeiss photometer. It is a comparison of the refracted light from a sample of beer with the light source as seen through a ground glass filter and is expressed as percent of the source light through the ground glass filter. For example, a reading of 20 Pulfrich units would indicate that 20% of the value of the light source was refracted in the sample.

*Example 1.—Treatment of Beer by Dry Addition of Hectorite*

Figure 2:
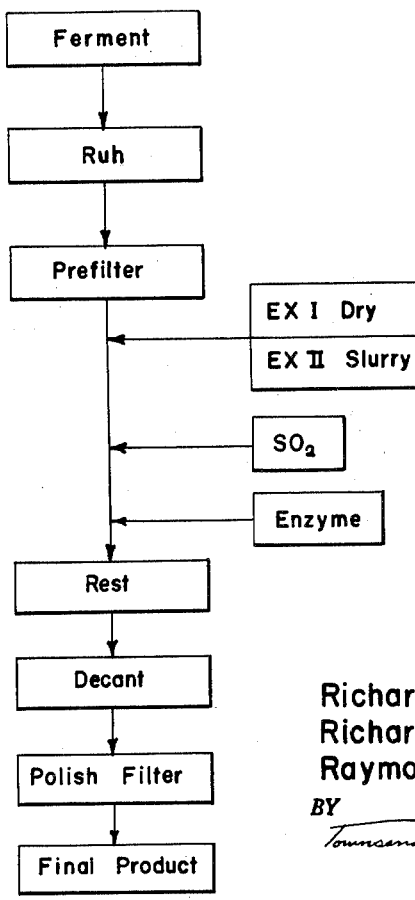
FIG. 2 shows a flow diagram of the brewery processing of beer including the steps of the working examples described hereinafter.

Beer was processed in the conventional method including the steps shown in FIG. 2. After the pre-filtration step, 200 parts per million of substantially dry powdered hectorite were introduced in a carbon dioxide stream. For purposes of this experiment, the introduction was made by means of a flock gun of the type used for spraying fibrous material. $CO_2$ pressure was about 40 pounds in excess of the beer line pressure. Concurrently, 19 parts per million of $SO_2$ gas, 3,000 activity units of bromelin per 100 barrels of beer, and 2,000 activity units of papain per 100 barrels of beer were introduced into the beer.

The dry clay that was introduced into the beer maintained a visual particle size and remained in suspension for only a limited time. Thus, within approximately a three hour period, the clay settled to the bottom of the vessel containing the beer.

The beer was allowed to rest for five full days and then was decanted from the sediment. The sediment was present in only a negligible quantity and barely covered the bottom of the tank.

The decanted beer was then polish filtered and carbonated, placed in final product condition, and analyzed for relative turbidity. The results indicate good resistance to chilling alone with an average reading of approximately 15 Pulfrich units, an average reading for agitation with chilling of approximately 30 Pulfrich units and an average reading of approximately 110 Pulfrich units for sensitivity to incubation and chilling.

*Example 2.—Treatment of Beer by Conventional Slurried Hectorite Method*

For a basis of comparison with the improved process of Example 1, beer was treated in accordance with the conventional method as follows:

After the fermentation, ruh, and pre-filtration steps indicated in FIG. 2, 200 parts per million hectorite was introduced into the beer in water suspension of 5% solids. At the same time 19 parts per million of $SO_2$ gas, 3,000 activity units per 100 barrels of bromelin, and 2,000 activity units per 100 barrels of papain were added. The beer was allowed to rest for five days.

The clay was flocculated and precipitated and the beer was decanted from above the clay sediment. The clay sediment occupied approximately 4% by volume of the total contents present and as a result contained large quantities of beer which were necessarily lost. The beer was polish filtered, carbonated, placed in final product condition, and analyzed.

The results indicate a stable beer with good resistance to chilling and to agitation with chilling. The clarity ranges were not in excess of 35 Pulfrich units. A slight sensitivity to incubation and chilling was noted with an average reading of 60 Pulfrich units.

Comparison of the results of the foregoing examples establishes that the improved dry addition techniques of the present invention produce a final product at least as satisfactory as that obtained by the slurry method. In many cases it has been found that the product is better than that obtained by the aqueous slurry techniques. They also establish the superiority of the dry addition technique in the important aspect of eliminating the loss of beer in the excessive volume of sediment formed in the aqueous addition technique.

What is claimed is:

1. In the method of treating beer after fermentation the improvement which comprises contacting the beer with about 120–500 parts per million of a swelling gelling clay in substantially dry form, and then completion of processing.

2. A method in accordance with claim 1 wherein the swelling gelling clay is hectorite.

3. In the method of treating beer after fermentation to clarify the beer and stabilize it by removing undesirable protein and proteinaceous complexes the improvement which comprises contacting the beer with about 120–500 parts per million of hectorite in substantially dry pulverant form, and then completion of processing.

4. A method in accordance with claim 3 wherein the hectorite is present in a quantity of about 200 parts per million of beer.

5. In the method of treating beer after fermentation the improvement which comprises dispersing about 120–500 parts per million of a swelling gelling clay in substantially dry powdered form in beer by injecting a gas propelled stream of the powdered clay into the beer under a pressure greater than that of the beer, and then completion of processing.

6. A method in accordance with claim 5 wherein the clay is hectorite and the gas propellant is carbon dioxide.

7. In the method for clarifying and stabilizing beer after fermentation including the step of disseminating an aqueous slurry of a swelling gelling clay in the beer, and then completion of processing, the improvement which comprises disseminating about 120–500 parts per million of the clay in the beer in substantially dry form whereby the sediment and beer entrapped therein are reduced, filtration is facilitated, and the yield of beer is increased.

References Cited in the file of this patent

UNITED STATES PATENTS

| | | |
|---|---|---|
| 508,882 | Hornbostel | Nov. 14, 1893 |
| 2,672,420 | Jeremiah | Mar. 16, 1954 |
| 2,916,377 | Shaler et al. | Dec. 8, 1959 |

OTHER REFERENCES

Schmid et al.: Brauwissenschaft, 1960, vol. 13, pp. 238–247.